(12) United States Patent
Ioku et al.

(10) Patent No.: US 12,327,083 B2
(45) Date of Patent: Jun. 10, 2025

(54) RELATED EXPRESSION EXTRACTION DEVICE AND RELATED EXPRESSION EXTRACTION METHOD

(71) Applicant: Hitachi, Ltd., Tokyo (JP)

(72) Inventors: Akira Ioku, Tokyo (JP); Hideki Hayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 233 days.

(21) Appl. No.: 18/025,950

(22) PCT Filed: Mar. 17, 2021

(86) PCT No.: PCT/JP2021/010897
§ 371 (c)(1),
(2) Date: Mar. 13, 2023

(87) PCT Pub. No.: WO2022/064741
PCT Pub. Date: Mar. 31, 2022

(65) Prior Publication Data
US 2023/0359816 A1    Nov. 9, 2023

(30) Foreign Application Priority Data
Sep. 28, 2020 (JP) ................................. 2020-162131

(51) Int. Cl.
G06F 40/216    (2020.01)
G06F 16/355    (2025.01)
G06F 40/35     (2020.01)
(52) U.S. Cl.
CPC .......... *G06F 40/216* (2020.01); *G06F 16/355* (2019.01); *G06F 40/35* (2020.01)

(58) Field of Classification Search
CPC ....... G06F 40/216; G06F 16/355; G06F 40/35
See application file for complete search history.

(56) References Cited

U.S. PATENT DOCUMENTS

2012/0078891 A1* 3/2012 Brown ................ G06F 16/3329
707/723
2017/0099249 A1* 4/2017 Kozareva ............... G06N 5/022
(Continued)

OTHER PUBLICATIONS

Japanese Office Action received in corresponding Japanese Application No. 2020-162131 dated Apr. 9, 2024.
(Continued)

*Primary Examiner* — Sonia L Gay
(74) *Attorney, Agent, or Firm* — MATTINGLY & MALUR, PC

(57) ABSTRACT

The present invention enables, according to a situation, accurate extraction of related expressions pertaining to search queries and question sentences. A related expression extraction device 1 receives input of text data, performs at least one of categorization of the received text data and determination of a structural pattern of the text data, determines, based on a result of at least one of the categorization of the text data and the determination of the structural pattern of the text data, which of a plurality of comparative assessment models 27 and 28 is used to extract related expression group data 26, and extracts a related expression related to content of the text data from the related expression group data 26 using the determined comparative assessment models 27 and 28.

10 Claims, 9 Drawing Sheets

(56) References Cited

U.S. PATENT DOCUMENTS

2017/0242915 A1* 8/2017 Torisawa ............ G06F 16/3329
2018/0341871 A1* 11/2018 Maitra ................. G06N 3/042

OTHER PUBLICATIONS

International Preliminary Report on Patentability received in corresponding International Application No. PCT/JP2021/010897 dated Jun. 22, 2021.
Extended European Search Report received in corresponding European Application No. 21871877.3 dated Jul. 1, 2024.
Isozaki, Hideki, et al., "Natural-Language-Processing Series 2, Question Answering Systems", Corona Publishing Co., Ltd., Aug. 21, 2009, pp. 110, 135-137, 153-165, Japan.
Sakata, Wataru et al. "Function Enhancement in FAQ Search Using Search Engines TSUBAKI and BERT in Administrative Dialogue System", Proceedings of the 25th Annual Meeting of the Association for Natural Language Processing, Mar. 2019, pp. 1022-1025.

* cited by examiner

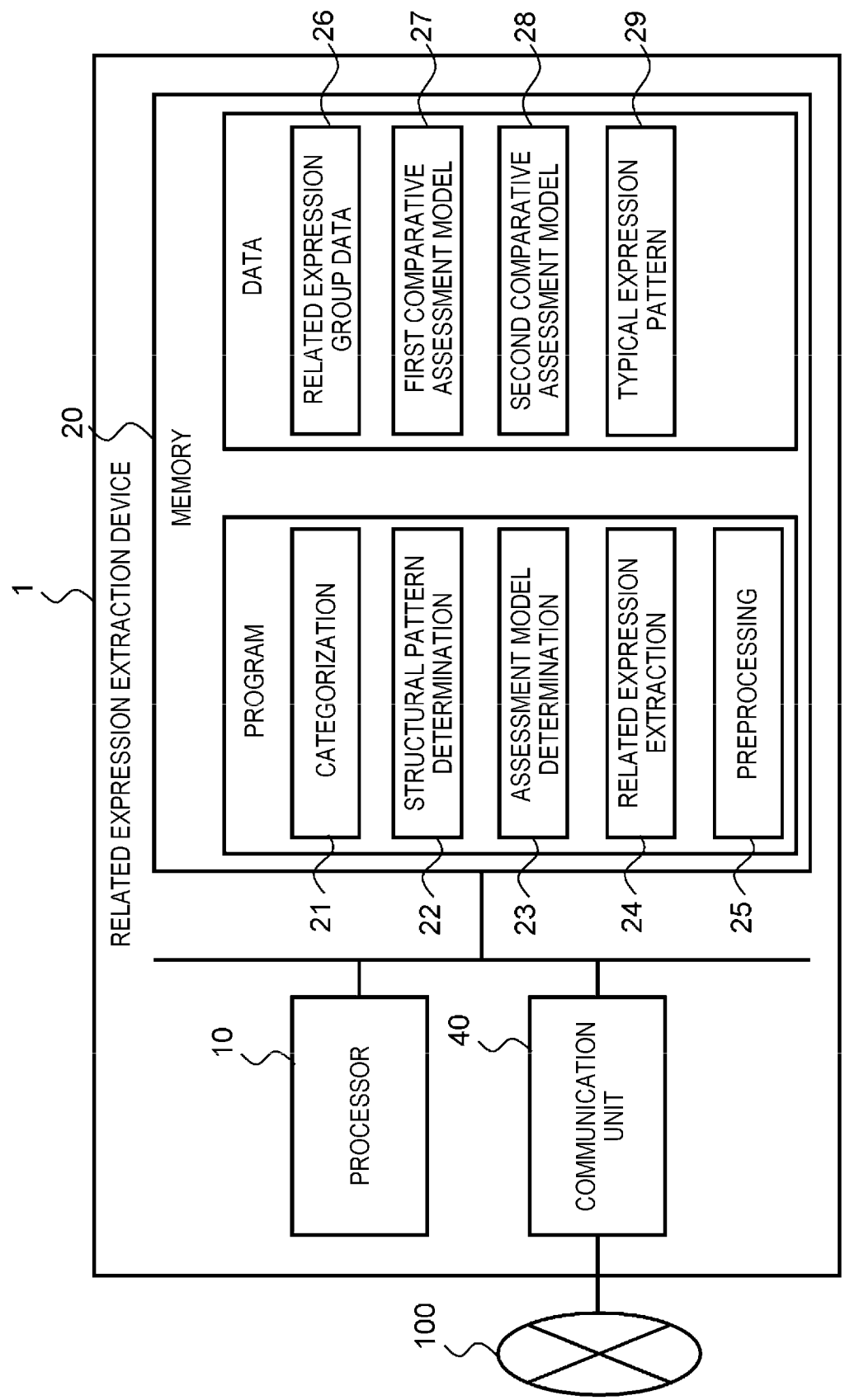
[FIG. 1]

[FIG. 2]
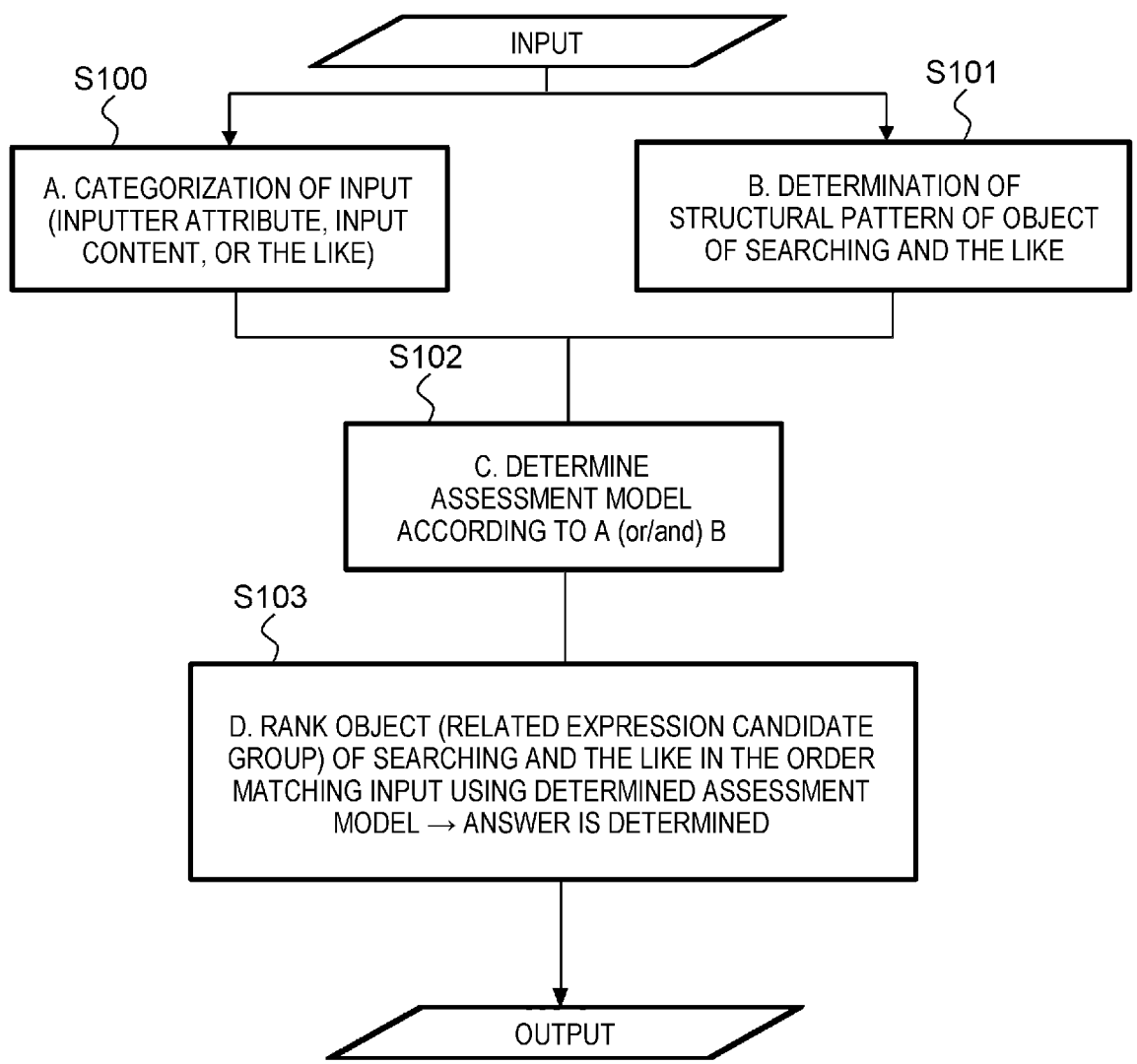

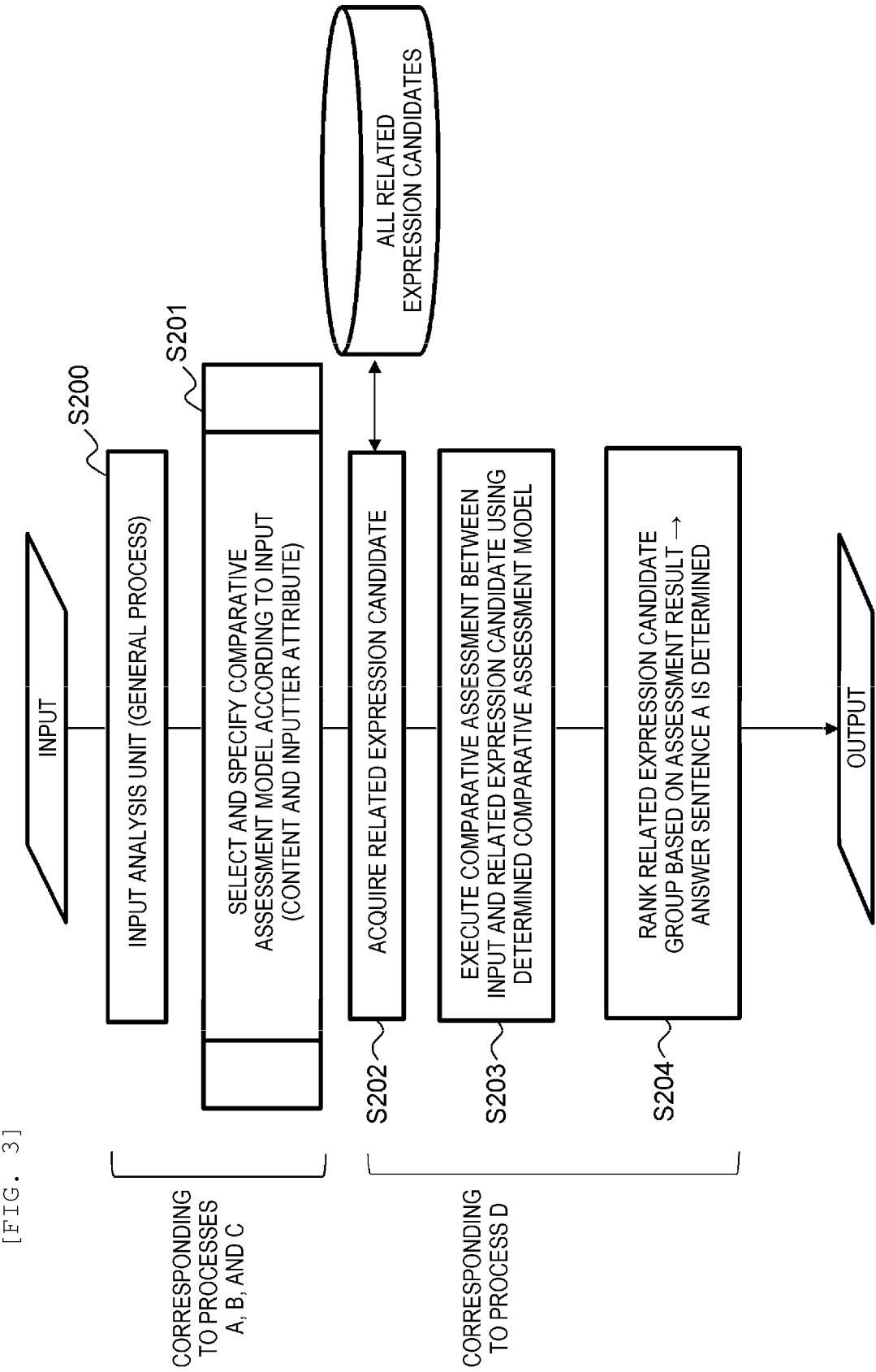

[FIG. 4]
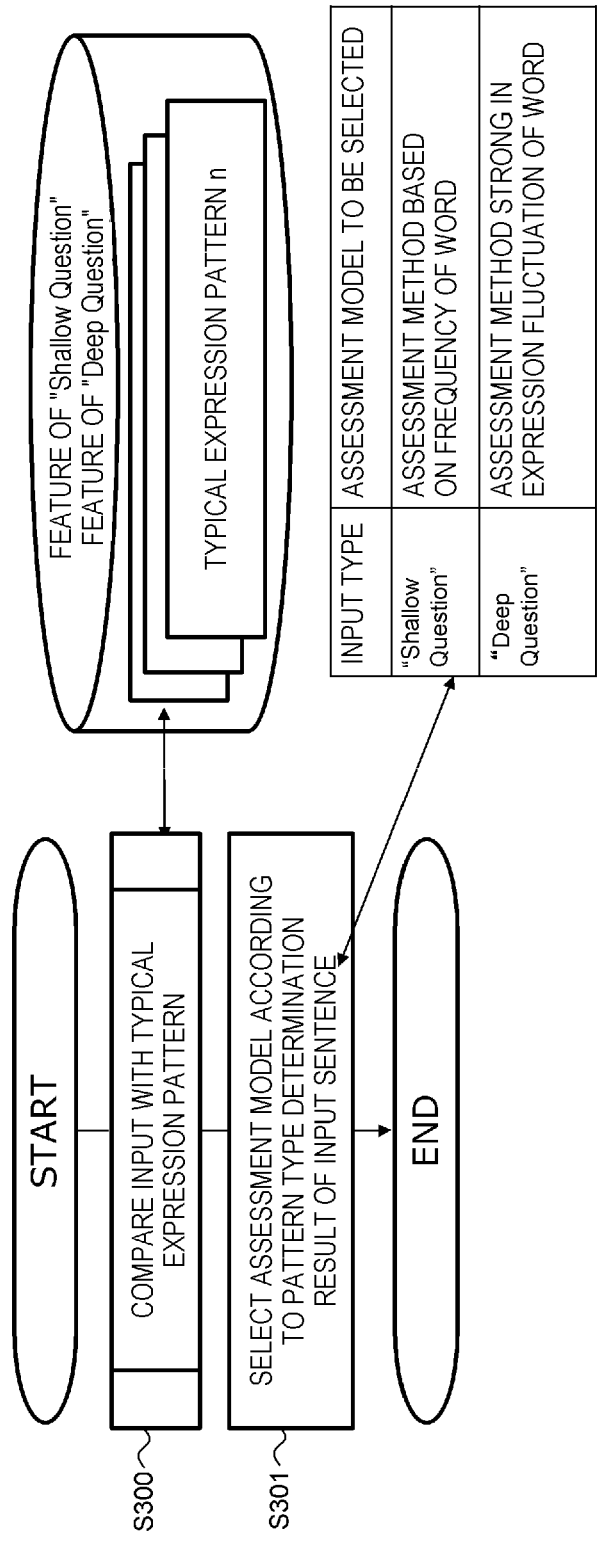

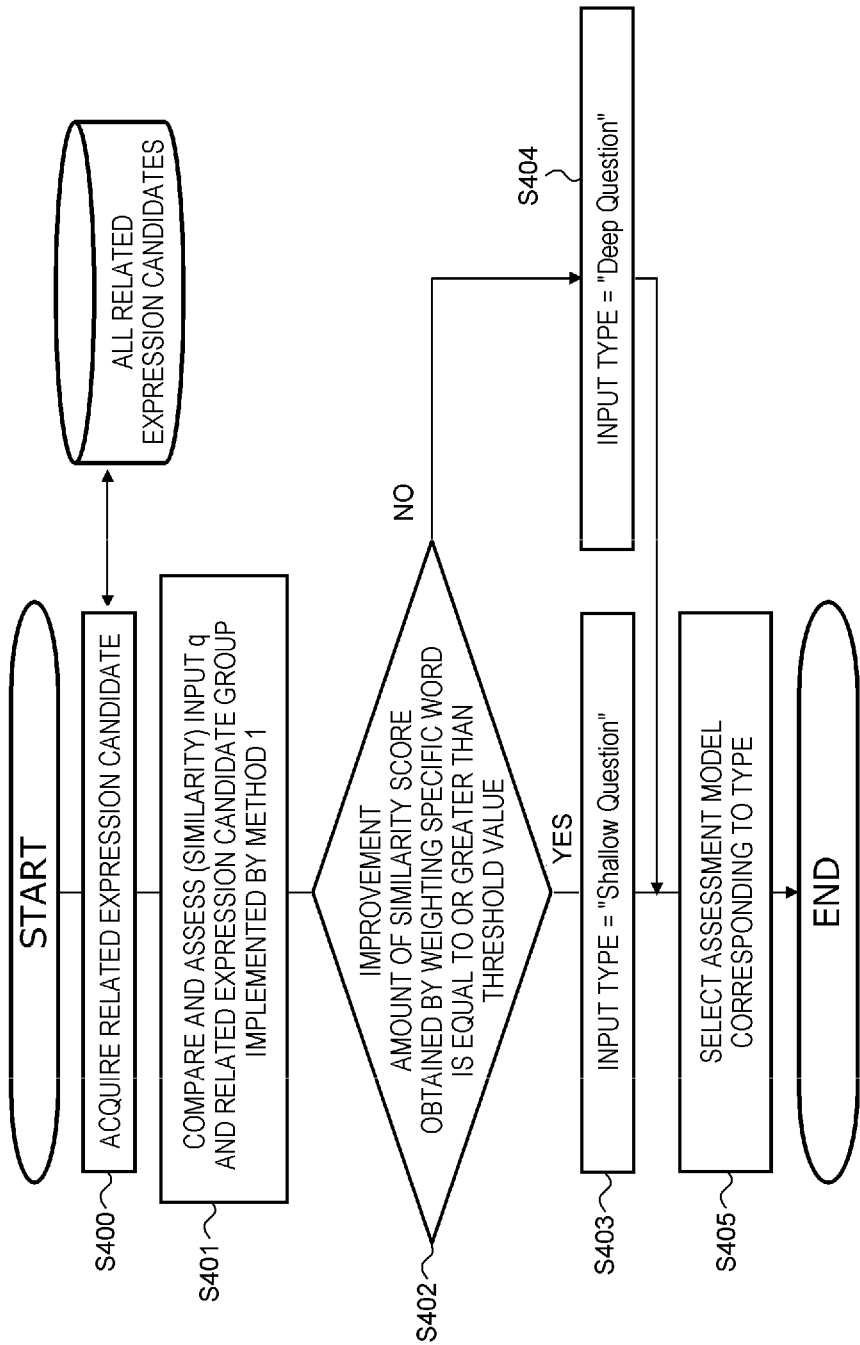

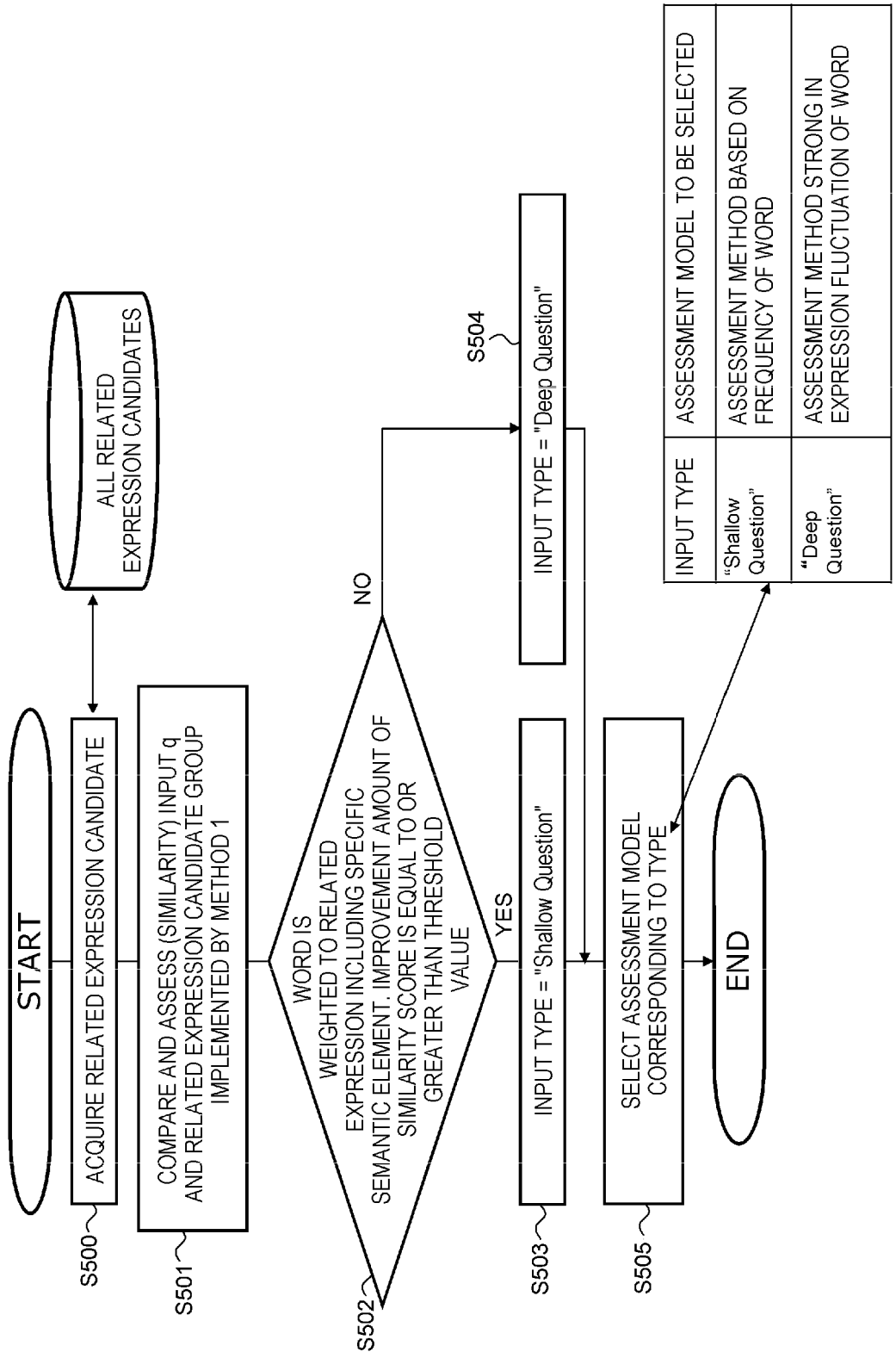
[FIG. 6]

[FIG. 7]
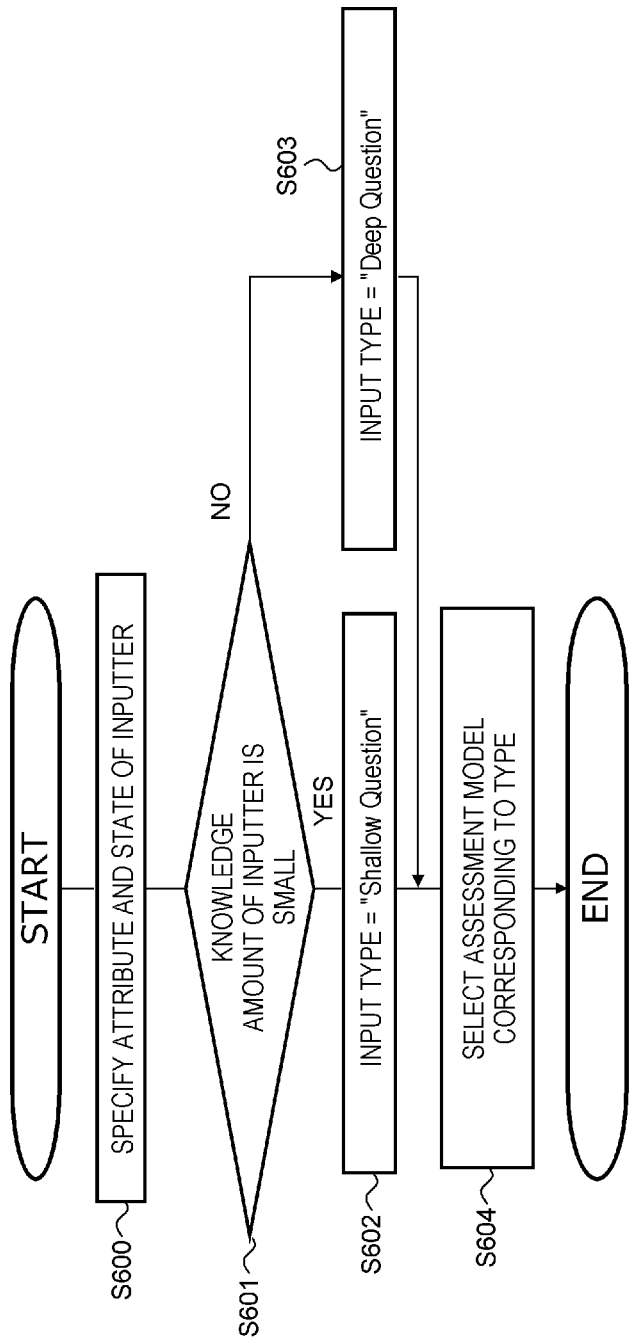

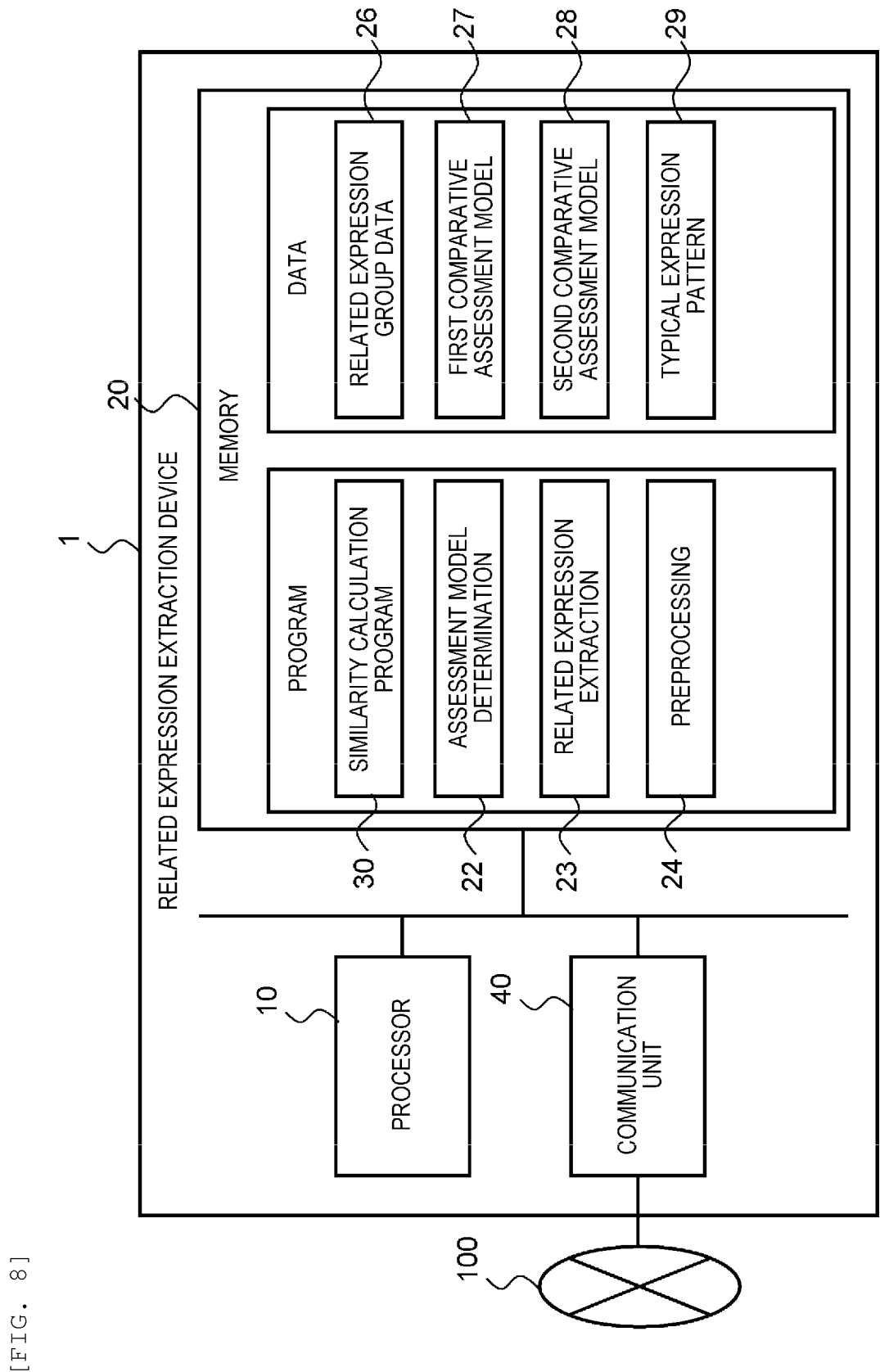
[FIG. 8]

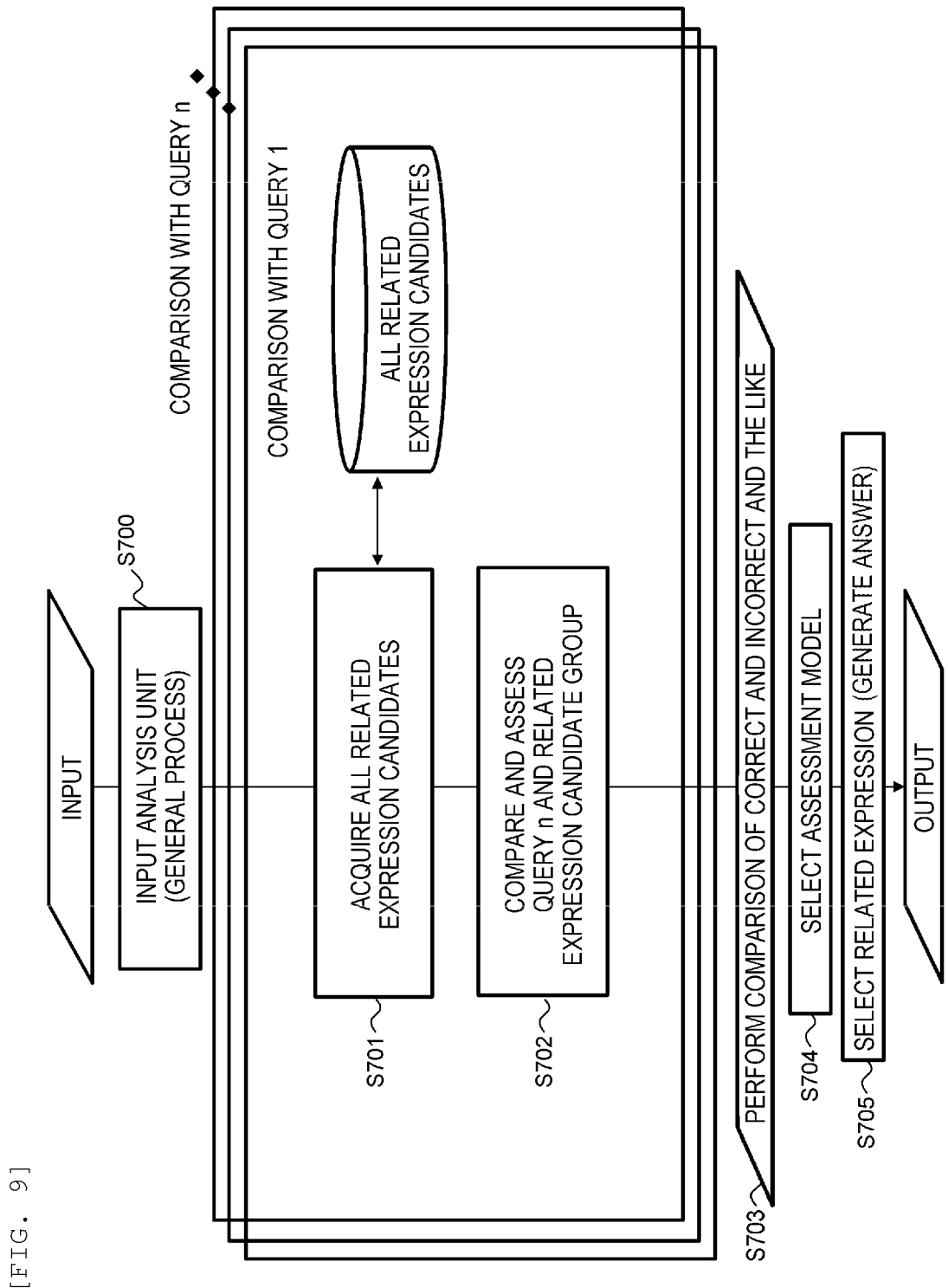

RELATED EXPRESSION EXTRACTION DEVICE AND RELATED EXPRESSION EXTRACTION METHOD

TECHNICAL FIELD

The present invention relates to a related expression extraction device and a related expression extraction method.

BACKGROUND ART

End-to-end learning based on deep learning (an assessment model 2 or a "second comparative assessment model" described later) expands a possibility of analysis for natural language accompanying dialogue, information recommendation, and guidance by a mechanism different from basic analysis (an assessment model 1 described later and a "first comparative assessment model" described later that is a method of understanding a similarity based on a frequency of a word or the like by utilizing frequency statistics in the case of inter-text comparison assessment model) such as appearance statistics and syntax analysis of words in the related art.

For example, in machine translation, by performing the end-to-end learning using a large amount of bilingual data, highly accurate translation is implemented without requiring an intermediate state such as a syntax tree or a predicate term structure.

However, a large amount of data cannot be prepared for any task. In such a task, it is considered that accuracy can be improved by attaching importance to a basic analysis result. In addition, an improvement in accuracy can be expected by using different assessment models having different features. For the purpose of implementing an effective question-answering system based on such a consideration, Non-PTL 1 adopts a method of appropriately selecting the assessment model 1 and the assessment model 2 as follows.

The assessment model 1 is an assessment method in which a degree of influence of a result of symbol matching (matching of appearance words or the like) between an input question sentence and a prepared sentence such as an answer candidate is large, and the assessment model 2 uses deep learning in consideration that the degree of the influence is smaller than that of the assessment model 1.

On the other hand, studies for implementing effective intellectual learning support are made. The result has a large influence not only on the learning support, but also on general systems that require adaptive instructions with a user, such as dialogue, information recommendation, and guidance.

In a technical art called "learning engineering" or the like, in order to implement the effective intellectual learning support, studies are made mainly from a viewpoint of the following four elements, and it can also be considered as a technique of effectively implementing the adaptive instruction in a search system.

(1) "Area model": expression of knowledge of an educational object
(2) "Learner model": expression of a learning state and a progress state
(3) "Guidance model": expression of guidance strategy
(4) "UI model": expression of a user interface and interaction

CITATION LIST

Non Patent Literature

Non-PTL 1: Sakata Wataru, other three persons, "advanced FAQ search using both search engines TSUBAKI and BERT in administrative dialogue system", Proceedings of the Twenty-fifth Annual Meeting of the Association for Natural Language Processing, [online], March, 2019, The Association for Natural Language Processing, [searched on Jul. 27, 2020], Internet <URL:https://www.anlp.jp/proceedings/annual_meeting/2019/pdf_d ir/F5-1.pdf>

SUMMARY OF INVENTION

Technical Problem

In "learning engineering" and the like, in order to implement the effective intellectual learning support, appropriate and effective support for individual learners is performed, and research targets include adaptive support, that is, generation, presentation, and recommendation of information (question, description, hint, scene, and the like) for prompting a study, an assembly method of a question series in a question exercise or training, a method of guiding a study (guiding method), a method of proceeding a dialogue with a learner, and the like corresponding to a feature (for example, a "learner model") of a state of a learner.

Also in the search system and a dialogue system, a consideration of a state of a searcher or questioner who is a subject of acquiring information that does not exist in Non-PTL 1 (a consideration corresponding to the "learner model") is considered to be an effective problem in improving an effect of the adaptive instruction.

The invention is made in view of the above problem, and provides a related expression extraction device and a related expression extraction method capable of accurately extracting a related expression of an input text or the like by considering a state of a searcher or a questioner (an amount of prerequisite knowledge or the like) such as a learner model in learning engineering when selecting an assessment model in extraction of the related expression.

Solution to Problem

In order to solve the above problem, a related expression extraction device according to one aspect of the invention is a related expression extraction device for extracting, with respect to input text data, a related expression related to content of the text data. The related expression extraction device includes a processor and a memory, the memory stores related expression group data including at least an answer to the content of the text data and a plurality of comparative assessment models that perform comparative assessment between the text data and the related expression group data, and the processor receives an input of the text data, performs at least one of categorization of the received text data and determination of a structural pattern of the text data, determines, based on a result of at least one of the categorization of the text data and the determination of the structural pattern of the text data, which of the plurality of comparative assessment models is used to extract the related expression group data, and extracts the related expression related to the content of the text data from the related expression group data using the determined comparative assessment model.

Advantageous Effects of Invention

According to the invention, it is possible to implement a related expression extraction device and a related expression extraction method capable of accurately extracting a related expression related to a search query or a question sentence according to a situation.

BRIEF DESCRIPTION OF DRAWINGS

FIG. 1 is a diagram illustrating a schematic configuration of a related expression extraction device according to a first embodiment.

FIG. 2 is a flowchart illustrating an outline of an operation of the related expression extraction device according to the first embodiment.

FIG. 3 is a flowchart illustrating an example of the operation of the related expression extraction device according to the first embodiment.

FIG. 4 is a flowchart illustrating an example of an operation of selecting and specifying a comparative assessment model of the related expression extraction device according to the first embodiment.

FIG. 5 is a flowchart illustrating another example of the operation of selecting and specifying the comparative assessment model of the related expression extraction device according to the first embodiment.

FIG. 6 is a flowchart illustrating still another example of the operation of selecting and specifying the comparative assessment model of the related expression extraction device according to the first embodiment.

FIG. 7 is a flowchart illustrating still another example of the operation of selecting and specifying the comparative assessment model of the related expression extraction device according to the first embodiment.

FIG. 8 is a diagram illustrating a schematic configuration of a related expression extraction device according to a second embodiment.

FIG. 9 is a flowchart illustrating an outline of an operation of the related expression extraction device according to the second embodiment.

DESCRIPTION OF EMBODIMENTS

Hereinafter, embodiments of the invention will be described with reference to the drawings. The embodiments described below do not limit inventions according to the claims, and all of elements and combinations thereof described in the embodiments are not necessarily essential to the solution of the invention.

In the drawings for illustrating the embodiments, parts having the same functions are denoted by the same reference numerals, and repeated description thereof will be omitted.

In addition, in the following description, an expression such as "xxx data" may be used as an example of information, but a data structure of the information may be any structure. That is, in order to indicate that the information does not depend on the data structure, "xxx data" can be referred to as "xxx table". Further, "xxx data" may be simply referred to as "xxx". In the following description, a configuration of each piece of information is an example, and the information may be divided and held, or may be combined and held.

In the following description, a process may be described using a "program" as a subject, but the subject of the process may be a program since the program is executed by a processor (for example, a central processing unit (CPU)) to appropriately perform a predetermined process using a storage resource (for example, a memory) and/or a communication interface device (for example, a port). The process described using the program as the subject may be a process performed by a processor or a computer including a processor.

In order to solve the above problem, the related expression extraction device according to the present embodiment selects a plurality of assessment models in accordance with a structural pattern of a text expressing a related information candidate and a type or pattern of a question or in accordance with a similarity or a degree of relevance between an input sentence (search query or question sentence) and the related information candidate (answer candidate), thereby contributing to an improvement in an effect of information analysis involving many natural languages such as dialogue and information recommendation.

Examples of selection criteria of the assessment model include (1) the degree of relevance and the similarity as a comparison result between the text expressing the related information candidate and a text constituting the input sentence and (2) a rule base (a type or pattern of the question: a rule related to determination as to whether the question is a specialized question or a general question).

A reason why attention is paid to the type or pattern of the question is that a state or the like (learner model) of an inputter (questioner) is not often reflected in the question. This is because paying attention to the type or pattern of the question also takes into account the state (as an example, an amount of prerequisite knowledge of the questioner) of the inputter (questioner or the like), and is considered to be useful for implementing an interaction with enhanced adaptability to the inputter. For example, "shallow question" and "deep question" are examples of the type of question. Here, the shallow question is a question that is relatively easy to answer, and is basically basic knowledge that is publicly described in the text. In addition, the deep question is a relatively difficult question, and integration of various pieces of information is required for an answer. With deepening of understanding of a knowledge area (target area) to be a question object, it is considered that necessity of knowledge acquisition by the "deep question" is higher than the "shallow question" for the questioner (reference: Kazuhisa Seta, other two persons, "Intelligent support of initiative activeness in open end learning space", Artificial Intelligence, The Japanese Society for Artificial Intelligence, March, 2020, 35, No. 2, p 208 to 217).

As the assessment models, the following models are prepared as typical options in the present embodiment.

That is, as an assessment model 1 (first comparative assessment model), a method (for example, a symbol matching method) performed based on information known by frequency statistics of a word or the like (a method of utilizing the frequency statistics and understanding the similarity based on the frequency of the word and the like in a case of inter-text comparison) and by basic analysis such as syntax analysis is given as a preferable example, and as an assessment model 2 (second comparative assessment model), a basic analysis (it is not essential to provide grammatical information of each language as external knowledge) method such as deep learning is given as a preferable example.

In the selection of the two assessment models, whether information required by an input sentence (a search query, a question sentence, or the like) can be regarded as knowledge that is carefully described as a text is used as a guideline. A preferable example that the information can be regarded as the knowledge that is carefully described as a text is a case where a keyword of the input sentence is present in a related expression candidate group. In this case, when the input sentence (the search query, the question sentence, or the like) is compared with a part of the related expression candidate group, an assessment model which has high commonality relating to an appearance frequency of a word or the like based on information obtained by morphological analysis or syntax analysis and in which the commonality is easily reflected in an assessment result is selected.

Consideration when Selecting the Assessment Model 1

The information required by the input sentence is knowledge carefully expressed in the text, and is suitable for a case where quotation of the information as it is is suitable as an answer. It is a situation that is easy to respond by simply selecting from a pair of a question sentence and an answer sentence prepared in advance. In particular, when it is confirmed that an important keyword of the input sentence similarly exist in a related expression candidate, the degree of matching of a word or the like with the input sentence is relatively large since the same keyword is similarly used in the related expression candidate and the input sentence, and it is considered that related expression may be adopted as an answer sentence according to a result of the assessment model 1 (it is sufficient to trust magnitude of an assessment score obtained by the assessment model 1).

Consideration when Selecting the Assessment Model 2

It is suitable for a case where quotation of partial information of the related expression candidate as it is is not suitable as an answer. It is a situation that is difficult to respond by simply selecting from a pair of a question sentence and an answer sentence prepared in advance, and a situation is assumed in which an answer is to be constructed after specifying information that is the answer from the related expression candidate group after performing interpretation including a synonym or a similar meaning term, and integrated interpretation of a plurality of pieces of information. In such an assumption, an assessment value of the assessment model 2 is adopted instead of an assessment value of the assessment model 1.

In the selection of whether the quotation of the partial information of the related expression candidate group as it is is suitable as an answer, attention is paid also to the type and pattern of the question. As described above, this is because paying attention to the type or pattern of the question also takes into account the state (as an example, an amount of prerequisite knowledge of the questioner) of the inputter (questioner or the like), and is considered to be useful for implementing an interaction with enhanced adaptability to the inputter.

As an example, it is considered that the case where the quotation of the partial information of the related expression candidate group as it is is suitable as an answer (and thus the assessment model 1 is selected as described above) is a case where the shallow question is answered. This is because the shallow question is a question that is relatively easy to answer, and is basically assumed to be basic knowledge that is carefully described as a text. On the other hand, the deep question is a relatively difficult question, and integration of various pieces of information is required for an answer. Quotation of relative partial information as it is is not suitable (thus, the assessment model 2 is selected).

Throughout the present specification, the term "related expression" includes a broad meaning. As an example, when the related expression extraction device is used for document searching, for a search query, an expression that matches the query is a related expression. When the related expression extraction device is used as a natural dialogue system and a question sentence is input, a response sentence that matches the question is a related expression. When the related expression extraction device is used as an automatic translation system, English that matches input Japanese is a related expression.

First Embodiment

FIG. 1 is a configuration diagram of a related expression extraction device according to the present embodiment.

A related expression extraction device 1 illustrated in FIG. 1 is a device capable of processing various types of information, for example, an information processing device such as a computer. The related expression extraction device 1 includes a processor 10, a memory 20, and a communication unit 40 that communicates with an external network 100. Further, the related expression extraction device 1 includes an input unit such as a mouse and a keyboard, and a screen unit such as a display, as necessary.

The processor is, for example, a central processing unit (CPU), a graphics processing unit (GPU), or a field-programmable gate array (FPGA). The memory includes, for example, a magnetic storage medium such as a hard disk drive (HDD), and a semiconductor storage medium such as a random access memory (RAM), a read only memory (ROM), and a solid state drive (SSD). In addition, a combination of an optical disk drive and an optical disk such as a digital versatile disk (DVD) is also used as the memory. In addition, a known storage medium such as a magnetic tape medium is also used as the memory.

The memory stores a program such as firmware. When an operation of the related expression extraction device 1 is started (for example, when power is turned on), the program such as firmware is read-out from the memory and executed, and overall control of the related expression extraction device 1 is performed. In addition to the program, the memory stores data and the like necessary for processes of the related expression extraction device 1.

The related expression extraction device 1 according to the present embodiment may be a so-called cloud in which a plurality of information processing devices can communicate with each other via a communication network.

The memory 20 of the related expression extraction device 1 according to the present embodiment stores, as programs, a categorization program 21, a structural pattern determination program 22, an assessment model determination program 23, a related expression extraction program 24, and a preprocessing program 25, and functional units corresponding to the programs are implemented by executing the programs. Functions performed by the functional units corresponding to the programs will be described in detail later.

In addition, the memory 20 of the related expression extraction device 1 according to the present embodiment stores, as data, related expression candidate group data 26, a first comparative assessment model 27, a second comparative assessment model 28, and a typical expression pattern 29.

The related expression candidate group data 26 stores a question sentence Q and an answer sentence A obtained based on an FAQ or the like as a pair. However, it is not essential that Q & A is stored as a pair. The related expression candidate group data 26 can refer to the entire related expression candidate group or a part of the related expression candidate group. The question sentence Q may be a template that can determine a typical expression pattern to be described later. The first comparative assessment model 27 and the second comparative assessment model 28 are as described above. The typical expression pattern representing the features of the "shallow question" and the "deep question" described above is an example of the typical expression pattern 29.

Next, the operation of the related expression extraction device 1 according to the present embodiment will be described with reference to flowcharts in FIGS. 2 to 7.

First, FIG. 2 is a flowchart illustrating an outline of the operation of the related expression extraction device 1 according to the present embodiment.

Based on a search query (search term, search sentence) received from or via the external network 100 or the like, the related expression extraction device 1 performs categorization of an input (an inputter attribute, an input content, or the like) by the categorization program 21 (step S100, hereinafter, may be referred to as "process A"). In addition, the related expression extraction device 1 determines, by the structural pattern determination program 22, a structural pattern of an object (as an example, a related expression candidate group) including information (knowledge or the like) desired to be searched based on the input information (the search query or the question sentence) (step S101, hereinafter, may be referred to as "process B").

Next, the related expression extraction device 1 determines an assessment model (either the first comparative assessment model 27 or the second comparative assessment model 28) by the assessment model determination program 23 based on at least one of the categorization process and the structural pattern determination process performed in steps S100 and S101 (step S102, hereinafter, may be referred to as "process C").

Then, the related expression extraction device 1 ranks, by the related expression extraction program 24, the related expression candidate from the related expression candidate group data 26 in the order matching the search query using the assessment model determined by the assessment model determination program 23, and determines an answer with respect to the search query based on the ranking (step S103, hereinafter, may be referred to as "process D").

Next, a specific operation of the related expression extraction device 1 according to the present embodiment will be described with reference to flowcharts in FIGS. 3 to 7.

FIG. 3 is a flowchart illustrating an example of the operation of the related expression extraction device 1 according to the present embodiment.

Based on the search query (search term, search sentence) received from or via the external network 100 or the like, the related expression extraction device 1 first performs input analysis (preprocessing) of the search query by the preprocessing program 25 (step S200). The preprocessing program 25 performs a so-called preprocessing operation in a general search system. Specifically, the preprocessing program 25 divides the search query into segment units and word units by using, for example, a morphological analysis method, and deletes a particle such as "te ni wo ha". Furthermore, the preprocessing program 25 performs preprocessing necessary for assessment model determination to be described later. Specifically, the preprocessing program 25 categorizes the search query or the like, determines whether information necessary for an answer is missing in the search query or the like, determines categorization of a component of a law such as whether the search query or the like requests a part of a requirement or requests a part of a provision if the search query or the like relates to a law, and further assesses a type or a pattern of the search query or the like (whether the search query or the like is the shallow question or the deep question described above).

Next, the related expression extraction device 1 selects and specifies a comparative assessment model (the first comparative assessment model 27 and the second comparative assessment model 28) according to the inputter attribute, the input content, and the like by the categorization program 21, the structural pattern determination program 22, and the assessment model determination program 23 (step S201). A specific process of step S201 will be described later with reference to FIGS. 4 to 7.

Next, the related expression extraction device 1 acquires the related expression candidate from the related expression candidate group data 26 by the related expression extraction program 24 (step S202). Then, the related expression extraction device 1 executes, by the related expression extraction program 24, a comparative assessment between the related expression candidate and the search query that is an input using the comparative assessment model specified in step S201 (step S203). Then, the related expression extraction device 1 ranks the related expression candidate by the related expression extraction program 24 based on the assessment result of step S203 (step S204). Accordingly, the answer sentence A is determined.

FIG. 4 is a flowchart illustrating an example of the operation of selecting and specifying the comparative assessment model of the related expression extraction device 1 according to the present embodiment, and is a flowchart illustrating the detailed operation of step S201 in FIG. 3.

First, the related expression extraction device 1 compares the search query that is the input with the typical expression pattern 29 by the categorization program 21 (step S300). The typical expression pattern 29 described here is a typical expression pattern that well expresses the features of the shallow question and the deep question.

As an example, the categorization program 21 determines, by natural language analysis of the question sentence Q, whether the question sentence Q is close to the feature of the shallow question or the feature of the deep question. Alternatively, when it is difficult to determine a type of the question sentence Q (when the question sentence Q has the same level of both the feature of the shallow question and the feature of the deep question), the categorization program 21 holds a rule for determining a state of the inputter, for example, whether the inputter is a specialist or a general person in cooperation with the preprocessing program 25, performs, with the inputter, Q & A capable of performing determination based on the rule, determines the state of the inputter based on the Q & A, and considers the state in the determination of the categorization of the question sentence. When it is determined that the inputter is a specialist having a large knowledge amount, a question having a high necessity of reading a line space with deep consideration at the time of an answer is input, that is, the question sentence Q is considered as the deep question. On the other hand, when it is determined that the inputter is a general person having a small knowledge amount, a basic question with a superficial and unique answer, that is, the question sentence Q is considered as the shallow question. This is handled as a determination result of a question type. Furthermore, types of a question for extracting more information ("deep digging question") and a question for transitioning to another topic ("topic transition question") are prepared for the same topic, the input sentence is understood by a depth and a width of the topic, and it is also possible to adopt, within a range not departing from the spirit of the invention, a determination in which the case of the "topic transition question" for widening the topic is handled in the same manner as the "deep question", and a case where the "deep digging question" continues is handled as corresponding to the "shallow question".

Next, the related expression extraction device 1 selects a comparative assessment model based on the determination result of step S300 by the assessment model determination program 23 (step S301). Here, the assessment model determination program 23 selects the first comparative assessment model 27 when it is determined that the question sentence Q is the shallow question. On the other hand, the assessment model determination program 23 selects the second comparative assessment model 28 when it is determined that the question sentence Q is the deep question.

FIG. 5 is a flowchart illustrating still another example of the operation of selecting and specifying the comparative assessment model of the related expression extraction device 1 according to the present embodiment.

First, the related expression extraction device 1 acquires the related expression candidate from the related expression candidate group data 26 by the structural pattern determination program 22 (step S400). Next, the related expression extraction device 1 compares and assesses the related expression candidate and the question sentence Q that is the input by the structural pattern determination program 22, and calculates a similarity based on the first comparative assessment model 27 (step S401).

In the calculation of the similarity, when a word or the like indicating a subject that is considered to be an important component of the related expression candidate matches a word or the like indicating a subject of a question sentence, a weighting operation may be performed such that a score increases (an index indicating the similarity increases). For example, when the question sentence Q is "when oo started?", the structural pattern determination program 22 determines that the question sentence Q relates to a certain subject, and sets weighting of a subject part included in the related expression candidate to be heavier than weighting of the other parts. Then, the similarity between the related expression candidate and the question sentence Q that is the input is calculated again.

Next, the related expression extraction device 1 categorizes the question sentence Q by the categorization program 21 and the preprocessing program 25. As an example, when an improvement amount of the similarity (that is, the similarity at the time of the weighting is a change amount before the weighting) is equal to or greater than a threshold value, the categorization program 21 and the preprocessing program 25 determine that there is a high possibility that a related expression candidate including oo in the subject is present (YES in step S402), and the process proceeds to step S403. On the other hand, when the improvement amount is less than the threshold value, the categorization program 21 and the preprocessing program 25 determine that the possibility of the related expression candidate including oo in the subject is not high (NO in step S402), and the process proceeds to step S404.

In step S403, the categorization program 21 determines that the type of the question sentence Q is the shallow question. On the other hand, in step S404, the categorization program 21 determines that the type of the question sentence Q is the deep question.

Thereafter, the related expression extraction device 1 selects the comparative assessment model by the assessment model determination program 23 (step S405). Here, the assessment model determination program 23 selects the first comparative assessment model 27 when it is determined that the type of the question sentence Q is the shallow question. On the other hand, the assessment model determination program 23 selects the second comparative assessment model 28 when it is determined that the type of the question sentence Q is the deep question.

FIG. 6 is a flowchart illustrating still another example of the operation of selecting and specifying the comparative assessment model of the related expression extraction device 1 according to the present embodiment.

First, the related expression extraction device 1 acquires the related expression candidate from the related expression candidate group data 26 by the structural pattern determination program 22 (step S500). Next, the related expression extraction device 1 compares and assesses the related expression candidate and the question sentence Q that is the input by the structural pattern determination program 22, and calculates a similarity based on the first comparative assessment model 27 (step S501).

In the calculation of the similarity, when a word or the like indicating a subject that is considered to be an important component of the related expression candidate matches a word or the like indicating a subject of a question sentence, a weighting operation may be performed such that a score increases (an index indicating the similarity increases). For example, when the question sentence Q is "when oo started?", the structural pattern determination program 22 determines that the question sentence Q relates to a certain period, and sets weighting of information relating to a period included in the related expression candidate to be heavier than weighting of the other parts. Then, the similarity between the related expression candidate and the question sentence Q that is the input is calculated again.

Next, the related expression extraction device 1 categorizes the question sentence Q by the categorization program 21 and the preprocessing program 25.

As an example, the categorization program 21 and the preprocessing program 25 determines that, when the improvement amount (that is, the change amount) of the similarity is equal to or greater than the threshold value, there is a high possibility that the related expression candidate including oo and describing the period is present (YES in step S502), and the process proceeds to step S503. On the other hand, when the improvement amount is less than the threshold value, the categorization program 21 and the preprocessing program 25 determine that the possibility of the related expression candidate including oo in the subject is not high (NO in step S502), and the process proceeds to step S504.

In step S503, the categorization program 21 determines that the type of the question sentence Q is the shallow question. On the other hand, in step S504, the categorization program 21 determines that the type of the question sentence Q is the deep question.

Thereafter, the related expression extraction device 1 selects the comparative assessment model by the assessment model determination program 23 (step S505). Here, the assessment model determination program 23 selects the first comparative assessment model 27 when it is determined that the type of the question sentence Q is the shallow question. On the other hand, the assessment model determination program 23 selects the second comparative assessment model 28 when it is determined that the type of the question sentence Q is the deep question.

FIG. 7 is a flowchart illustrating still another example of the operation of selecting and specifying the comparative assessment model of the related expression extraction device 1 according to the present embodiment.

First, the related expression extraction device 1 specifies an attribute and a state of an inputter by the categorization program 21 (step S600). Here, the attribute of the inputter includes information indicating whether the inputter is a specialist or a general person, and the state of the inputter includes a knowledge amount of the inputter.

An operation of specifying the attribute and the state of the inputter performed by the categorization program 21 is performed, for example, by the inputter inputting the state of the inputter himself to the related expression extraction device 1 or teaching the state to the related expression extraction device 1 and specifying the state based on an input of the inputter or the like. Therefore, the related expression extraction device 1 presents a guide question for determining whether the inputter is a new person or a specialist to the inputter before an input of a search query, and the inputter answers the guide question. The categorization program 21 determines the state of the inputter based on the answer to the guide question.

Alternatively, the categorization program 21 determines the state of the inputter based on content of the query input by the inputter. In the specification in step S600, the categorization program 21 does not analyze expression of the question sentence Q.

Next, when the categorization program 21 determines that the knowledge amount of the inputter is small (YES in step S601), the process proceeds to step S602. On the other hand, when the categorization program 21 determines that the knowledge amount of the inputter is not small (NO in step S601), the process proceeds to step S603.

In step S602, the categorization program 21 determines that the type of the question sentence Q is the shallow question. On the other hand, in step S603, the categorization program 21 determines that the type of the question sentence Q is the deep question.

Thereafter, the related expression extraction device 1 selects the comparative assessment model by the assessment model determination program 23 (step S604). Here, the assessment model determination program 23 selects the first comparative assessment model 27 when it is determined that the type of the question sentence Q is the shallow question. On the other hand, the assessment model determination program 23 selects the second comparative assessment model 28 when it is determined that the type of the question sentence Q is the deep question.

As described above in detail, according to the related expression extraction device 1 of the present embodiment, it is possible to appropriately select the comparative assessment model based on the state of the inputter who inputs the question sentence Q (learning model), and thus it is possible to extract the answer sentence A that is more appropriate for the question sentence Q. Therefore, according to the present embodiment, it is possible to implement the related expression extraction device 1 capable of accurately extracting the related expression related to the search query or the question sentence according to a situation.

Second Embodiment

In the related expression extraction device 1 according to the first embodiment described above, the comparative assessment model is selected for each search query, and a plurality of search queries may be collected to select a comparative assessment model.

FIG. 8 is a diagram illustrating a schematic configuration of the related expression extraction device 1 according to the second embodiment. The related expression extraction device 1 according to the present embodiment includes a similarity calculation program 30 instead of omitting the categorization program 21 and the structural pattern determination program 22. An operation of the similarity calculation program 30 will be described later.

FIG. 9 is a flowchart illustrating an outline of the operation of the related expression extraction device 1 according to the present embodiment.

Based on the search query (search term, search sentence) received from or via the external network 100 or the like, the related expression extraction device 1 first performs input analysis (preprocessing) of the search query by the preprocessing program 25 (step S800). Since the process performed by the preprocessing program 25 is the same as that of the preprocessing program 25 according to the first embodiment described above, the description thereof will be omitted here.

Next, the related expression extraction device 1 performs processes of steps S801 and S802 for a plurality of search queries (in the illustrated example, queries 1 to n: n is a natural number). The processes of steps S801 and S802 may be performed in parallel or sequentially.

First, the related expression extraction device 1 acquires all related expression candidates from the related expression candidate group data 26 by the similarity calculation program 30 (step S801). Next, the similarity calculation program 30 performs comparative assessment between the search query or the question sentence and the related expression candidate group by calculating a similarity (step S802). The similarity referred to here refers to a degree of coincidence based on a word between the search query and each related expression candidate.

Next, the related expression extraction device 1 compares similarities of the queries 1 to n by the assessment model determination program 23 (step S803). Then, the assessment model determination program 23 determines a comparative assessment model based on the comparison result in step S803 (step S804). Among determination methods of the comparative assessment model in step S804, the simplest method is a method of distinguishing the comparative assessment model between a search query having a high similarity and a search query having a low similarity, and can be said to be a method of determining the comparative assessment model by majority decision.

Then, the related expression extraction device 1 executes, by the related expression extraction program 24, a comparative assessment between the related expression candidate and the search query that is an input using the comparative assessment model specified in step S804, and ranks the related expression candidate based on the assessment result by the related expression extraction program 24 (step S805). Accordingly, the answer sentence A is determined.

Therefore, also according to the present embodiment, it is possible to achieve the same operation and effect as those of the related expression extraction device 1 according to the first embodiment.

The configurations of the embodiments described above have been described in detail in order to describe the invention in an easy-to-understand manner, and the invention is not necessarily limited to those including all the configurations described above. A part of the configuration according to each embodiment can be added to, deleted from, or replaced with another configuration.

A part or all of the configurations, functions, processing units, processing method, and the like described above may be implemented by hardware, for example, by designing an integrated circuit. The invention can also be implemented by a program code of software that implements the functions according to the embodiments. In this case, a storage medium in which the program code is recorded is provided in a computer, and a processor included in the computer reads the program code stored in the storage medium. In this case, the program code itself read from the storage medium implements the functions of the embodiments described above, and the program code itself and the storage medium storing the program code constitute the invention. Examples of the storage medium for supplying such a program code include a flexible disk, a CD-ROM, a DVD-ROM, a hard disk, a solid state drive (SSD), an optical disk, a magneto-optical disk, a CD-R, a magnetic tape, a nonvolatile memory card, and a ROM.

The program code for implementing the functions described in the present embodiment can be implemented in a wide range of programs or script languages such as assembler, C/C++, perl, Shell, PHP, Java (registered trademark), and Python.

Further, all or a part of the program codes of the software for implementing the functions according to each embodiment may be stored in the memory 20 in advance, or may be stored in the memory 20 from a non-transitory storage device of another device connected to the network 100 or from a non-transitory storage medium via an I/F (not illustrated) included in the related expression extraction device 1, as necessary.

Furthermore, the program code of the software for implementing the functions according to the embodiments may be distributed via a network to be stored in a storage unit such as a hard disk or a memory of a computer, or a storage medium such as a CD-RW or a CD-R, and the processor included in the computer may read and execute the program code stored in the storage unit or the storage medium.

In the embodiments described above, control lines and information lines that are considered to be necessary for the description are described, and all the control lines and the information lines in the product are not necessarily described. All the configurations may be connected to each other.

REFERENCE SIGNS LIST

1: related expression extraction device
10: processor
20: memory
21: categorization program
22: structural pattern determination program
23: assessment model determination program
24: related expression extraction program
25: preprocessing program
26: related expression candidate group data
27: first comparative assessment model
28: second comparative assessment model
29: typical expression pattern
30: similarity calculation program
40: communication unit
100: external network

The invention claimed is:

1. A related expression extraction device for extracting, with respect to input text data, a related expression related to content of the text data, the related expression extraction device comprising:

a processor; and
a memory,
wherein the memory stores related expression group data including at least an answer to the content of the text data and a plurality of comparative assessment models that perform comparative assessment between the text data and the related expression group data,
wherein the processor receives an input of the text data, performs at least one of categorization of the received text data and determination of a structural pattern of the text data, determines, based on a result of at least one of the categorization of the text data and the determination of the structural pattern of the text data, which of the plurality of comparative assessment models is used to extract the related expression group data, and extracts the related expression related to the content of the text data from the related expression group data using the determined comparative assessment model, and
wherein the memory stores the first comparative assessment model based on a frequency of a word included in the text data and the second comparative assessment model that is strong in expression fluctuation of a word included in the text data.

2. The related expression extraction device according to claim 1, wherein
the related expression group data stores a typical question corresponding to the answer as a pair with the answer.

3. The related expression extraction device according to claim 1, wherein
the processor performs, on the text data, at least one of segmentation in word units, categorization of the text data received after performing morphological analysis including part-of-speech analysis, and specification of the structural pattern of the text data.

4. The related expression extraction device according to claim 3, wherein
the memory stores a typical expression pattern of the text data, and
the processor compares the received text data with the typical expression pattern and determines which of a first comparative assessment model and a second comparative assessment model is used to extract the related expression group data.

5. The related expression extraction device according to claim 4, wherein
the processor determines, based on whether the content of the received text data is a first typical expression pattern that can be answered using a single answer or a second typical expression pattern that can be answered using a plurality of answers, which of the first comparative assessment model and the second comparative assessment model is used to extract the related expression group data.

6. The related expression extraction device according to claim 5, wherein
the processor extracts a phrase such as a word corresponding to a specific semantic element of the content of the text data, calculates a similarity between the text data and the answer by making weighting of the phrase included in the answer heavier than weighting of other words included in the answer, determines that the content is the first typical expression pattern when the similarity is equal to or greater than a predetermined threshold value, and determines that the content is the second typical expression pattern when the similarity is less than the threshold value.

7. The related expression extraction device according to claim 6, wherein
the specific semantic element of the content of the text data is any one or a plurality of subjects, elements of 5W1H (when, where, who, whose, what, and how), requirements, effects, principles, and exceptions.

8. The related expression extraction device according to claim 5, wherein
the processor extracts a subject semantic element related to a subject of the content of the text data, calculates a similarity between the text data and the answer by making weighting of the subject semantic element included in the answer heavier than weighting of other semantic elements included in the answer, determines that the content is the first typical expression pattern when the similarity is equal to or greater than a predetermined threshold value, and determines that the content is the second typical expression pattern when the similarity is less than the threshold value.

9. The related expression extraction device according to claim 5, wherein
the processor determines, based on the text data input in the past by an inputter who created the text data, a knowledge amount of the inputter, or determines the knowledge amount based on a guide answer obtained by transmitting a guide question asking for the knowledge amount to the inputter and the guide question being answered by the inputter, determines that the content is the first typical expression pattern when the knowledge amount is less than a predetermined threshold value, and determines that the content is the second typical expression pattern when the knowledge amount is equal to or more than the threshold value.

10. A related expression extraction method performed by a related expression extraction device for extracting, with respect to input text data, a related expression related to content of the text data,
wherein the related expression extraction device includes a processor and a memory,
wherein the memory stores related expression group data including at least an answer to the content of the text data and a plurality of comparative assessment models that perform comparative assessment between the text data and the related expression group data,
wherein the related expression extraction method comprises:
receiving an input of the text data;
performing at least one of categorization of the received text data and determination of a structural pattern of the text data;
determining, based on a result of at least one of the categorization of the text data and the determination of the structural pattern of the text data, which of the plurality of comparative assessment models is used to extract the related expression group data;
extracting the related expression related to the content of the text data from the related expression group data using the determined comparative assessment model; and
the memory stores the first comparative assessment model based on a frequency of a word included in the text data and the second comparative assessment model that is strong in expression fluctuation of a word included in the text data.

* * * * *